United States Patent
Fan et al.

(10) Patent No.: US 10,267,978 B2
(45) Date of Patent: Apr. 23, 2019

(54) BACKLIGHT MODULE AND LIQUID CRYSTAL DISPLAY DEVICE

(71) Applicant: Shenzhen China Star Optoelectronics Technology Co., Ltd., Guangdong (CN)

(72) Inventors: Yong Fan, Guangdong (CN); Zuoyuan Qin, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 21 days.

(21) Appl. No.: 14/782,218

(22) PCT Filed: Jun. 12, 2015

(86) PCT No.: PCT/CN2015/081387
§ 371 (c)(1),
(2) Date: Oct. 2, 2015

(87) PCT Pub. No.: WO2016/197394
PCT Pub. Date: Dec. 15, 2016

(65) Prior Publication Data
US 2016/0363717 A1   Dec. 15, 2016

(30) Foreign Application Priority Data
Jun. 9, 2015 (CN) .......................... 2015 1 0312647

(51) Int. Cl.
*F21V 8/00* (2006.01)

(52) U.S. Cl.
CPC ......... *G02B 6/0078* (2013.01); *G02B 6/0051* (2013.01); *G02B 6/0068* (2013.01); *G02B 6/0088* (2013.01)

(58) Field of Classification Search
CPC .. G02B 6/0078; G02B 6/0088; G02B 6/0028; G02B 6/0013; G02B 6/0015; G02B 6/0016; G02B 6/0018
(Continued)

(56) References Cited

U.S. PATENT DOCUMENTS

| | | |
|---|---|---|
| 6,712,482 B2 | 3/2004 | Kawakami et al. |
| 9,310,053 B2 | 4/2016 | Qiao et al. |

(Continued)

FOREIGN PATENT DOCUMENTS

| | | |
|---|---|---|
| CN | 1350200 | 5/2002 |
| CN | 2638097 | 9/2004 |

(Continued)

OTHER PUBLICATIONS

International Search Report for PCT/CN2015/081387, English Translation attached to original, Both completed by the Chinese Patent Office dated Mar. 3, 2016, All together 8 Pages.

(Continued)

*Primary Examiner* — Angela K Davison
(74) *Attorney, Agent, or Firm* — Mintz Levin Cohn Ferris Glovsky and Popeo, P.C.; Kongsik Kim; Jhongwoo Jay Peck

(57) ABSTRACT

A backlight module including a back plate and a light guide plate structure and a light source assembly disposed on the back plate, wherein the light guide plate structure is mainly formed by splicing a plurality of light guide plate blocks, each of the plurality of light guide plate blocks includes a splicing end surface and at least one incident light end surface, and the light source assembly is disposed on at least one incident light end surface of the light guide plate blocks. Additionally, a liquid crystal display including the above backlight module is disclosed. The light guide plate structure in the backlight module may reduce a light mixing height of (Continued)

the backlight module and is advantageous to thinning the product; in addition, the structure of the light guide plate is simple and easy to be implemented, which is advantageous to lower the cost of the product.

14 Claims, 3 Drawing Sheets

(58) Field of Classification Search
 USPC ...... 349/61, 62, 65; 362/600, 616, 632, 615, 362/628
 See application file for complete search history.

(56) References Cited

U.S. PATENT DOCUMENTS

| | | | | |
|---|---|---|---|---|
| 2009/0290093 | A1* | 11/2009 | Shimura | G02B 6/0078 349/62 |
| 2012/0287369 | A1* | 11/2012 | Tsuji | G02B 6/0031 349/58 |
| 2014/0119051 | A1* | 5/2014 | Qiao | G02B 6/0028 362/609 |
| 2015/0055026 | A1* | 2/2015 | Ikuta | H04N 5/64 348/791 |
| 2015/0078032 | A1* | 3/2015 | Horiguchi | G02F 1/133308 362/607 |
| 2016/0170132 | A1 | 6/2016 | Sugimoto | |

FOREIGN PATENT DOCUMENTS

| | | |
|---|---|---|
| CN | 101818883 | 9/2010 |
| CN | 102588828 | 7/2012 |
| CN | 202403078 | 8/2012 |
| CN | 102661556 | 9/2012 |
| CN | 102927524 | 2/2013 |
| CN | 104765097 | 7/2015 |
| WO | 2015016091 | 2/2015 |

OTHER PUBLICATIONS

Chinese Search Report for Chinese Application No. CN 2015103126472, Completed by the Chinese Patent Office, dated Nov. 3, 2016, 2 Pages.
First Office Action for Chinese Application No. CN 201510312647. 2, English Translation attached to original, Both completed by the Chinese Patent Office, dated Nov. 15, 2016, All together 13 Pages.

* cited by examiner

BACKLIGHT MODULE AND LIQUID CRYSTAL DISPLAY DEVICE

CROSS-REFERENCE TO RELATED APPLICATION

This application is the U.S. national phase of PCT Application No. PCT/CN2015/081387 filed on Jun. 12, 2015, which claims priority to CN Patent Application No. 201510312647.2 filed on Jun. 09, 2015, the disclosures of which are incorporated in their entirety by reference herein.

TECHNICAL FIELD

The present disclosure relates to liquid crystal display technical field, and more particularly to a backlight module and a liquid crystal display device.

BACKGROUND ART

With the evolution of photoelectricity and semiconductor technologies, the vigorous development of a Flat Panel Display has been driven, while a Liquid Crystal Display (LCD) has become the market mainstream due to lots of advantageous properties, such as high utilization efficiency of space, low power consumption, no radiation and low electromagnetic interference, etc., among many flat panel displays. A LCD generally includes a Liquid Crystal Panel and a Back Light Module (BL). Since the LCD is a passive display which does not possess a self-luminescent function, a backlight module hereby needs to be installed to provide a display light source required by the display panel. As such, whether a surface light source generated by the backlight module possesses enough and uniform luminance directly affects the display quality of the LCD. Also, a LED becomes a first choice of the application light source of the backlight module due to the characteristics such as high light emitting efficiency, long life and low power consumption, etc.

Currently, the backlight module may be classified into two types, an Edge Lighting and a Direct Lighting, according to the structure thereof. An edge lighting backlight has advantages such as low power consumption and thin thickness, etc., but weight is heavy and cost is relatively high due to use of a light guide plate. In a liquid crystal display with a supersize (more than 100 inches), since the size of the panel is large, the transmittance thereof is low and the requirement for color gamut is high. Since the size is relatively large, many optical parts, such as a light guide plate, either cannot be produced with an appropriate size, or can be produced with an appropriate size by paying huge price. Hence, a direct lighting type backlight is generally adopted in a liquid crystal display with a supersize, although the direct lighting type backlight uses less number of light sources, has no light guide plate and has low cost, it is disadvantageous to thinning a product due to a light box being positioned high and thick appearance.

SUMMARY

To this end, the present disclosure provides a backlight module, wherein it provides a light guide plate structure suitable for a large-sized liquid crystal display, which may reduce a light mixing height of the backlight module and is advantageous to thinning the product; in addition, the structure of the light guide plate is simple and easy to be implemented, which is advantageous to lower the cost of the product.

In order to achieve the above objects, the present disclosure adopts the following technical solution:

A backlight module includes a back plate and a light guide plate structure and a light source assembly disposed on the back plate, wherein the light guide plate structure is mainly formed by splicing a plurality of light guide plate blocks, each of the plurality of light guide plate blocks includes a splicing end surface and at least one incident light end surface, and the light source assembly is disposed on at least one incident light end surface of the light guide plate blocks.

Wherein there is an interval between two opposite splicing end surfaces in two adjacent light guide plate blocks.

Wherein the splicing end surfaces present a wedge structure having a single inclined surface, and an angle α between the inclined surface and a bottom surface of the wedge structure is 10-80°.

Wherein optical lattice points are disposed on the inclined surface of the wedge structure.

Wherein the splicing end surfaces present a wedge structure having double inclined surfaces, a first inclined surface of the wedge structure is connected to a top surface of the light guide plate blocks and a top portion of the wedge structure, a second inclined surface is connected to a bottom surface of the light guide plate blocks and the top portion of the wedge structure, an angle β1 between the first inclined surface and a horizontal plane where the top portion of the wedge structure is located is 0-90°; and an angle β2 between the second inclined surface and the horizontal plane where the top portion of the wedge structure is located is 0-90°.

Wherein optical lattice points are disposed on the first and second inclined surfaces.

Wherein each of the light guide plate blocks is connected to the back plate through a thread fastener.

Wherein a reflector is further disposed between each of the light guide plate blocks and the back plate.

Wherein a diffusion plate is further disposed above the light guide plate structure, and there is a light mixing height between the diffusion plate and the light guide plate structure. The light guide plate structure is further connected with a support bracket for supporting the diffusion plate.

The present disclosure further provides a liquid crystal display device, which includes a liquid crystal panel and a backlight module which are oppositely disposed, the backlight module provides a display light source to the liquid crystal panel so that the liquid crystal panel displays an image, wherein the backlight module is the backlight module previously described.

The backlight module provided by an embodiment of the present disclosure is mainly applied to a large-sized liquid crystal display device, the light guide plate structure therein is mainly obtained by splicing a plurality of light guide plate blocks, whose structure is simple and easy to be implemented, thereby facilitating to reduce cost of a large-sized product. In addition, splicing end surfaces of the plurality of light guide plate blocks are disposed to be a wedge structure, which may increase a light mixing path of light ray and may reduce a light mixing height between the light guide plate structure and the diffusion plate, thereby facilitating to thinning the product.

DETAILED DESCRIPTION OF EXEMPLARY EMBODIMENTS

Below the technical solutions in exemplary embodiments of the present disclosure are described in detail in conjunction with the accompanying drawings and detailed embodiments, and it is apparent that the described embodiments are only a part of exemplary embodiments of the present disclosure rather than all of the exemplary embodiments. Based on the embodiments of the present disclosure, all of the other embodiments obtained by those ordinarily skilled in the art without exerting creative labor fall within the protection scope of the present disclosure.

Figure 1:
FIG. 1 is a structure diagram of a liquid crystal display device provided by an embodiment of the present disclosure.

The present embodiment first provides a liquid crystal display device, referring to FIG. 1, the liquid crystal display device includes a liquid crystal panel 100 and a backlight module 200 which are oppositely disposed, the backlight module 200 provides a display light source to the liquid crystal panel 100 so that the liquid crystal panel 100 displays an image.

Further, the present embodiment further provides a backlight module 200 applied to the above liquid crystal display device.

Figure 2:
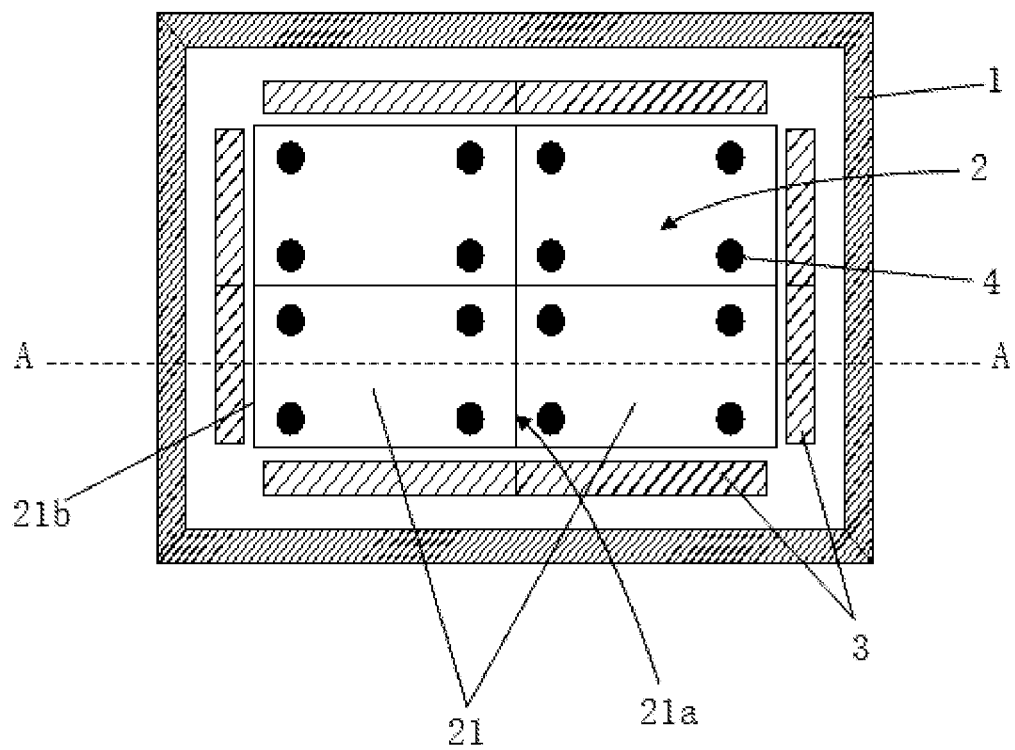
FIG. 2 is a structure diagram of a backlight module provided by an embodiment of the present disclosure.
Figure 3:
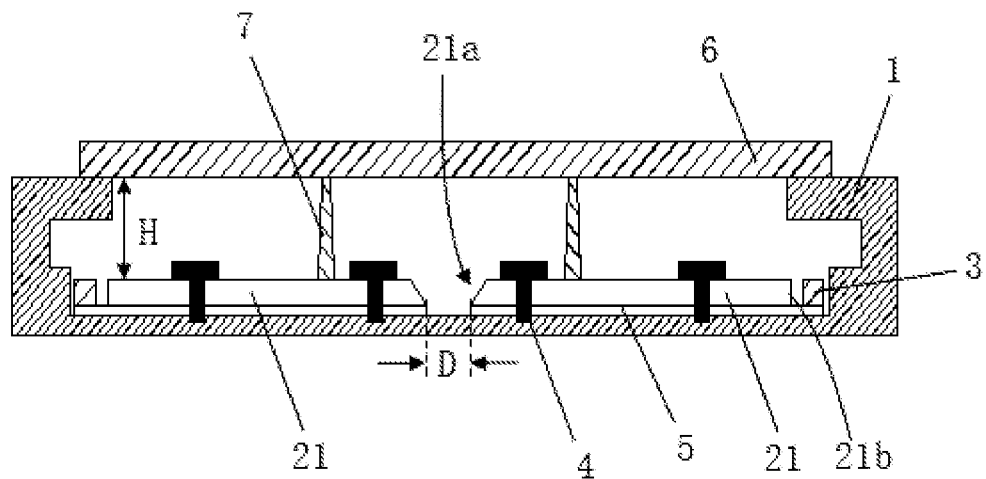
FIG. 3 is a structure sectional view of a backlight module along a direction of AA line in FIG. 2.

Specifically, referring to FIGS. 2 and 3, the backlight module 200 includes a back plate 1 and a light guide plate structure 2 and a light source assembly 3 disposed on the back plate 1. Wherein the light guide plate structure 2 is mainly formed by splicing a plurality of light guide plate blocks 21, each of the light guide plate blocks 21 includes a splicing end surface 21a and at least one incident light end surface 21b, and the light source assembly 3 is disposed on at least one incident light end surface 21b of the light guide plate blocks 21. As illustrated in FIG. 1, the light guide plate structure 2 in the present embodiment is formed by splicing a plurality of light guide plate blocks 21, each of the light guide plate blocks 21 includes two splicing end surfaces 21a and two incident light end surfaces 21b. Wherein the two incident light end surfaces 21b are both disposed with the light source assemblies 3, and periphery of the finally formed light guide plate structure 2 is all disposed with light source assemblies 3. Of course, in another embodiments, there may also be: only one of the two incident light end surfaces 21b therein is disposed with a light source assembly 3. However, in a large-sized liquid crystal display device, more light sources generally need to be disposed, thus, two incident light end surfaces 21b provided in the present embodiment being both disposed with light source assemblies 3 is a better embodiment.

In the backlight module having the above structure, the light guide plate structure therein is mainly obtained by splicing a plurality of light guide plate blocks, which implements an edge lighting type backlight used in a large-sized liquid crystal display device, and the structure of the light guide plate is simple and easy to be implemented, which is advantageous to reduce cost of a large-sized product.

Figure 4:
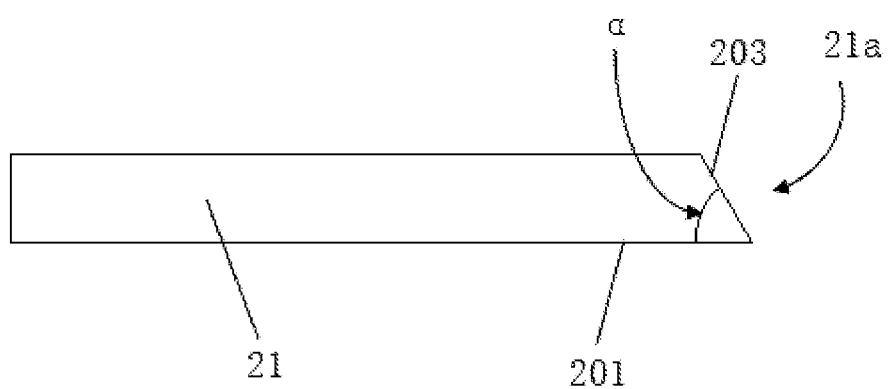
FIG. 4 is a structure diagram of a splicing end surface of a light guide plate block in an embodiment of the present disclosure.

Further, as illustrated in FIG. 3, the plurality of light guide plate blocks 21 forming the light guide plate structure 2 are connected to the back plate 1 through thread fasteners 4. A reflector 5 is further disposed between each of the light guide plate blocks 21 and the back plate 1. Wherein a diffusion plate 6 is further disposed above the light guide plate structure 2, there is a light mixing height H between the diffusion plate 6 and the light guide plate structure 2, and the light guide plate structure 2 is further connected with a support bracket 7 for supporting the diffusion plate 6 to prevent the diffusion plate 6 from being collapsed.

Wherein in the present embodiment, as illustrated in FIG. 3, there is an interval D between two opposite splicing end surfaces 21a in two adjacent light guide plate blocks 21. Wherein as illustrated in FIG. 4, the splicing end surface 21a presents a wedge structure having a single inclined surface, and an angle $\alpha$ between the inclined surface 203 and the bottom surface 201 of the wedge structure may be set to be 10-80°. Splicing end surfaces 21a of the plurality of light guide plate blocks 21 are disposed to be a wedge structure, and there is an interval D between two splicing end surfaces 21a, which may increase a light mixing path of light ray and may reduce a light mixing height H between the light guide plate structure 2 and the diffusion plate 6, thereby facilitating to thin the product. Further, optical lattice points may be further disposed on the inclined surface 203 of the wedge structure, which may reduce the light mixing height H between the light guide plate structure 2 and the diffusion plate 6.

Figure 5:
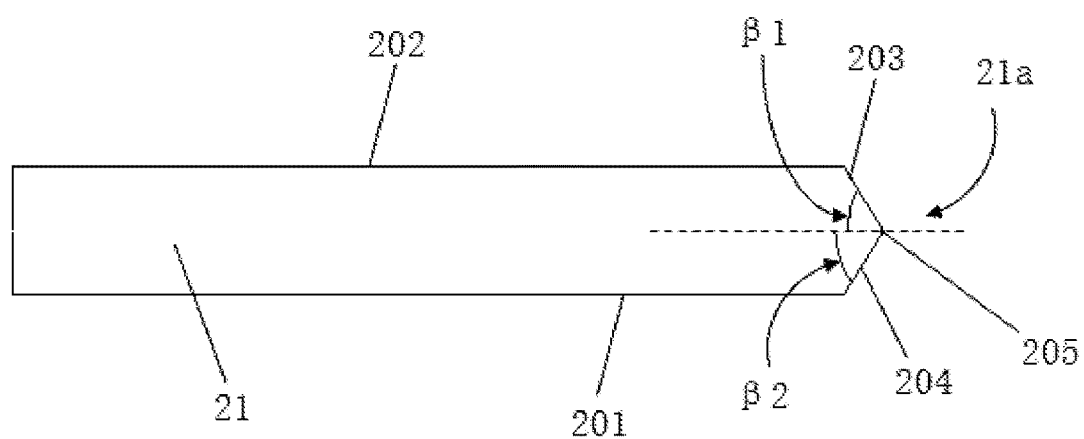
FIG. 5 is a structure diagram of a splicing end surface of a light guide plate block in another embodiment of the present disclosure.

For the structure of the splicing end surface 21a, in another preferred embodiment, as illustrated in FIG. 5, the splicing end surface 21a presents a wedge structure having double inclined surfaces, a first inclined surface 203 of the wedge structure is connected to a top surface 202 of the light guide plate blocks 21 and a top portion 205 of the wedge structure, a second inclined surface 204 is connected to a bottom surface 201 of the light guide plate blocks 21 and the top portion 205 of the wedge structure, an angle $\beta 1$ between the first inclined surface 203 and a horizontal plane (parallel with the bottom surface 201 and the top surface 202) where the top portion 205 of the wedge structure is located may be set to be 0-90°; and an angle $\beta 2$ between the second inclined surface 204 and the horizontal plane where the top portion 205 of the wedge structure is located may be set to be 0-90°. $\beta 1$ and $\beta 2$ may be the same and may be not the same. Further, optical lattice points may be disposed on both of the first and second inclined surfaces 203 and 204.

It should be explained that the relationship terms, such as first and second, etc., in the present disclosure are only used for distinguishing one entity or operation from another entity or operation without requiring or implying any actual relation or sequence existing between these entities or operations. Moreover, the term "include", "contain" or any other variant means covering instead of exclusively including, so that a process, method, object or device including a series of factors not only includes those factors but also includes other factors that are not explicitly listed, or further includes inherent factors for this process, method, object or device. Where no more limitations are provided, the factors defined by a sentence "include one . . . " do not exclude additional identical factors further existing in the process, method, object or device which includes the factors.

Obviously, the protection scope of the present disclosure is not limited to the above detailed implementations, and those skilled in the art may make various changes and modifications to the disclosure without departing from the scope and spirit of the present disclosure. As such, if these changes and modifications of the present disclosure belong to the scope of the claims and equivalent technologies thereof in the present disclosure, the present disclosure also intends to include these changes and modifications herein.

The invention claimed is:

1. A backlight module, comprising:
   a back plate;
   a light guide plate structure;
   a diffusion plate disposed above the light guide plate structure and defining a light mixing height therebetween; and
   a plurality of light sources, both the light guide plate structure and the sources being disposed on the back plate,
   wherein the light guide plate structure defines a plurality of light guide plate blocks, each of the light guide plate blocks includes a splicing end surface at a first end and an incident light end surface at a second end disposed opposite the first end, at least one of the light sources is disposed about the incident light end surface of each of the light guide plate blocks, and at least two of the light guide plate blocks are arranged such that the respective splicing end surfaces of two blocks are disposed adjacent to one another and the respective incident light end surfaces of the two blocks are disposed opposite one another;
   wherein at least one of the splicing end surfaces forms a double incline with respect to a plane disposed between and parallel to top and bottom surfaces, the double incline includes a first inclined portion extending from the top surface toward the plane and a second inclined portion extending from the bottom surface toward the plane, the first and second portions connect with one another about the plane, the first portion defines an angle β1 with respect to the plane having a value between 0° and 90°, and the second portion defines an angle β2 with respect to the plane having a value between 0° and 90°; and
   wherein the adjacent splicing end surfaces of two blocks define an interval therebetween to reduce the light mixing height between the light guide plate structure and the diffusion plate.

2. The backlight module of claim 1, wherein at least one of the splicing end surfaces, other than the at least one of the splicing end surfaces that forms the double incline, forms a first incline extending from a top surface of the light guide plate block to a bottom surface of the light guide plate block.

3. The backlight module of claim 2, wherein the first incline of the splicing end surfaces defines an angle α with respect to the bottom surface of the light guide plate block, and the angle α having a value between 10° and 80°.

4. The backlight module of claim 1, wherein each of the light guide plate blocks is connected to the back plate using a plurality of threaded fasteners.

5. The backlight module of claim 1, further comprising a reflector disposed between each of the light guide plate blocks and the back plate.

6. The backlight module of claim 1, wherein the light guide plate structure further comprises a support bracket configured to support the diffusion plate.

7. The backlight module of claim 1, wherein each of the splicing end surfaces includes a plurality of optical dots.

8. A liquid crystal display device, comprising:
   a liquid crystal panel; and a backlight module disposed parallel to the panel and configured to provide light to the liquid crystal panel for generating an image thereupon,
   wherein the backlight module comprises a back plate, and a light guide plate structure and a plurality of light sources both disposed on the back plate, the light guide plate structure defines a plurality of light guide plate blocks, each of the light guide plate blocks comprising a splicing end surface and an incident light end surface disposed opposite the splicing end surface, at least one of the light sources is disposed about the incident light end surface of each of the light guide plate blocks, and at least two of the light guide plate blocks are arranged such that the respective splicing end surfaces of two blocks are disposed adjacent to one another and the respective incident light end surfaces of the two blocks are disposed opposite one another;
   wherein at least one of the splicing end surfaces forms a double incline with respect to a plane disposed between and parallel to top and bottom surfaces of the light guide plate block, the double incline includes a first inclined portion extending from the top surface toward the plane to connect, about the plane, to a second inclined portion extending from the bottom surface toward the plane, the first portion defines an angle β1 with respect to the plane having a value between 0° and 90°, and the second portion defines an angle β2 with respect to the plane having a value between 0° and 90°; and
   wherein the backlight module further comprises a diffusion plate disposed above the light guide plate structure and defining a light mixing height therebetween; the adjacent splicing end surfaces of two blocks define an interval therebetween to reduce the light mixing height between the light guide plate structure and the diffusion plate.

9. The liquid crystal display device of claim 8, wherein at least one of the splicing end surfaces, other than the at least one of the splicing end surfaces that forms the double incline, forms a first incline extending from a top surface of the light guide plate block to a bottom surface of the light guide plate block.

10. The liquid crystal display device of claim 9, wherein the first incline of the splicing end surfaces defines an angle a with respect to the bottom surface of the light guide plate block, and the angle a having a value between 10° and 80°.

11. The liquid crystal display device of claim 8, wherein each of the light guide plate blocks is connected to the back plate using a plurality of threaded fasteners.

12. The liquid crystal display device of claim 8, further comprising a reflector disposed between each of the light guide plate blocks and the back plate.

13. The liquid crystal display device of claim 8, wherein the light guide plate structure further comprises a support bracket configured to support the diffusion plate.

14. The liquid crystal display device of claim 8, wherein each of the splicing end surfaces includes a plurality of optical dots.

* * * * *